(12) United States Patent
Dutta-Choudhury

(10) Patent No.: US 7,636,465 B2
(45) Date of Patent: Dec. 22, 2009

(54) CROSS-FRAME OBJECT RECONSTRUCTION FOR IMAGE-BASED CYTOLOGY APPLICATIONS

(75) Inventor: Paul Dutta-Choudhury, Franklin, MA (US)

(73) Assignee: Cytyc Corporation, Marlborough, MA (US)

( * ) Notice: Subject to any disclaimer, the term of this patent is extended or adjusted under 35 U.S.C. 154(b) by 655 days.

(21) Appl. No.: 11/299,046

(22) Filed: Dec. 9, 2005

(65) Prior Publication Data

US 2007/0133856 A1 Jun. 14, 2007

(51) Int. Cl.
G06K 9/00 (2006.01)
(52) U.S. Cl. .................................... 382/133
(58) Field of Classification Search ............... 382/128, 382/129, 133, 134; 128/920–930; 250/455–465; 356/39–49
See application file for complete search history.

(56) References Cited

U.S. PATENT DOCUMENTS

2004/0071327 A1* 4/2004 Ellis et al. ................ 382/128
2004/0114218 A1* 6/2004 Karlsson et al. ........... 359/368

* cited by examiner

Primary Examiner—Samir A. Ahmed
Assistant Examiner—Atiba O Fitzpatrick
(74) Attorney, Agent, or Firm—Vista IP Law Group LLP

(57) ABSTRACT

Methods, computer software, and systems for analyzing a biological specimen (e.g., a cytological specimen) on a slide is provided. Magnified image data frames of the biological specimen are taken at different locations on the slide. An object that is not entirely contained within at least one of the image data frames is identified, and complementary portions of the object respectively located in different ones of the image data frames are matched. A fully integrated object is created from the matched object portions. Attributes of the integrated object are then analyzed.

2 Claims, 14 Drawing Sheets

CROSS-FRAME OBJECT RECONSTRUCTION FOR IMAGE-BASED CYTOLOGY APPLICATIONS

FIELD OF THE INVENTION

The field of the present invention generally relates to methods and systems for diagnostically imaging specimens, such as cytological specimens.

BACKGROUND OF THE INVENTION

In the medical industry, there is often a need for a laboratory technician, e.g., a cytotechnologist, to review a cytological specimen for the presence of specified cell types. For example, there is presently a need to review a cervico-vaginal Papanicolaou (Pap) smear slides for the presence of malignant or pre-malignant cells. Since its introduction over fifty years ago, Pap smears have been a powerful tool for detecting cancerous and precancerous cervical lesions. During that time, the Pap smear has been credited with reducing mortality from cervical cancer by as much as 70%. This once precipitous drop in the death rate has slowed however, and the mortality rate in the United States for this preventable disease has remained virtually constant, at about 5,000 per year since the mid-eighties. Therefore, about one-third of the 15,000 women diagnosed with cervical cancer annually still die, because the cancer was detected too late. A further cause for concern is National Cancer Institute data that shows an annual 3% increase in the incidence of invasive cervical cancer in white women under 50 years of age since 1986.

A number of factors may be contributing to this current threshold, not the least of which is the fact that many women, particularly in high risk populations, are still not participating in routine cervical cancer screening. Another contributing factor that has received much attention is the limitation of the traditional Pap smear method itself.

The reliability and efficacy of a cervical screening method is measured by its ability to diagnose precancerous lesions (sensitivity) while at the same time avoiding false positive diagnosis (specificity). In turn, these criteria are dependent on the accuracy of the cytological interpretation. The conventional Pap smear has false negative rates ranging from 10-50%. This is due in large part to the vast number of cells and objects (typically as many as 100,000 to 200,000) that must be reviewed by a technician to determine the possible existence of a small number of malignant or pre-malignant cells. Thus, Pap smear tests, as well as other tests requiring detailed review of biological material, have suffered from a high false negative rate due to fatigue imposed on the technician.

To facilitate this review process, automated systems have been developed by various companies to focus the technician's attention on the most pertinent cells, with a potential to discard the remaining cells from further review. A typical automated system includes an imager and an automated optical microscope. Briefly, the imager can be operated to provide a series of numerous images of a cytological specimen slide, referred to as image frames, each depicting a different portion of the slide. The imager then processes these image frames to determine the most pertinent biological objects for review on the slide, and their locations (x-y coordinates) on the slide. This information is then passed on to the microscope, which, based on the x-y coordinates received from the imager, automatically or semi-automatically displays the biological objects for review by the technician. The technician can then mark any objects on the slide that he or she believes require further review by a pathologist, for example, any objects having attributes consistent with malignant or pre-malignant cells. In general, this automated procedure has proved to be successful, since the technician's attention is focused on a limited number of objects, obviating the need for the technician to review the vast number of objects (biological or not) on the specimen.

In typical automated imaging/review systems, such as those used in cytological applications, it is desirable to capture an entire object of interest of a specimen within a single image data frame, so that an object or feature presented on the slide or other carrier, can be classified or otherwise processed in an accurate manner. That is, because the image frames are processed on a frame-by-frame basis, an object that only has a portion represented in an image frame might be ignored or misclassified when that image frame is processed.

One way to do address this concern is to configure the image frames in an overlapping manner. For example, FIG. 1 illustrates a subset of image frames IF that depict objects O carried by a slide (not shown). While it can be appreciated that many image frames are typically used to capture many more objects in standard imaging systems, for purposes of brevity and clarity, only three image frames $IF_1$, $IF_2$, and $IF_3$ and three objects $O_1$, $O_2$, and $O_3$ are illustrated in FIG. 1. The imager is configured, such that the image frames have an overlap factor in both the horizontal and vertical directions in an attempt to ensure that objects that are touching or split across the border of an image frame will be entirely represented in another image frame. For example, object $O_1$ is illustrated as being entirely contained in either of image frames $IF_1$ and $IF_2$. While object $O_2$ is illustrated as crossing the border of image frame $IF_1$, it is entirely contained within image frame $IF_2$. Thus, in these cases, objects $O_1$ and $O_2$ should be accurately classified or otherwise processed.

However, because the image frame processing efficiency decreases as the overlap factor increases, the amount that any particular image frame overlaps another is limited. As such, it is possible that an object may not be entirely contained within a single frame even if an overlapping image frame configuration is employed. For example, object $O_3$ illustrated in FIG. 1 is so large that is crosses both borders of adjacent image frames $IF_2$ and $IF_3$, and thus, will not be entirely contained within a single image frame. Thus, it is quite possible that object $O_3$ will either be ignored or inaccurately represented when either of the image frames $IF_2$ and $IF_3$ are processed.

In the case where the specimen is to be classified based on the consideration of the objects contained within the specimen, the fact that a particular object is ignored or inaccurately represented may not have a significant negative impact on the classification of such specimen when there are many other diagnostically equivalent objects similarly situated to the ignored or inaccurately represented object, since it is very likely that at least one of these objects will be entirely located within an image frame, and thus accurately processed. However, when there are very few objects or no other object similarly situated to the ignored or inaccurately represented object, it is quite possible that none of these objects will be entirely located within an image frame, and either ignored or inaccurately processed for this reason or other reasons. As such, it may be important to accurately process an object that is not entirely contained within a single image frame.

There, thus, remains a need to improve automated imaging systems, such as those used to image and process cytological specimens.

SUMMARY OF THE INVENTION

In accordance with a first aspect of the present inventions, an automated method of analyzing a biological specimen (e.g., a cytological specimen) on a slide is provided. The method comprises receiving magnified image data frames of the biological specimen taken at different locations on the slide. In one method, the image data frames overlap each other to ensure that every portion of the biological specimen is imaged. The method further comprises identifying an object that is not entirely contained within at least one of the image data frames, and matching complementary portions of the object respectively located in different ones of the image data frames. For example, the identification of the object as not being entirely contained within the at least one image data frame may comprise identifying if the object intersects two or more adjacent borders of the different image data frames. The method further comprises creating a fully integrated object from the matched object portions (e.g., by digitally stitching the complementary object portions together). The different image data frames in which the complementary portions of the object are located can number two or more image data frames.

The object portion matching and integrated object analysis may be performed in response to the receipt of all image data frames of the biological specimen. Alternatively, object portion matching and integrated object analysis may be performed in response to the receipt of the different image frames (i.e., in response to the image data frames that contain all the necessary information for reconstructing the partially contained object). In optional method further comprises determining a size of one of the complementary object portions, wherein the fully integrated object is created only if the size of the one object portion is greater than a threshold size.

The method further comprises analyzing attributes of the integrated object. Optionally, an object entirely contained within any of the different image data frames can be identified and its attributes analyzed. The integrated object may be optionally characterized as an object of interest based on the analysis. In an optional method, the biological specimen is classified at least partially based on the integrated object analysis. In one method, the attributes of one of the complementary object portions may either not be analyzed or may be inaccurately analyzed as a normal step in processing the biological specimen. However, because the integrated object created from the complementary object portions will be accurately analyzed, the non-analysis or inaccurate analysis of the individual complementary object portions is irrelevant. An optional method comprises identifying the integrated object as an object of interest to be located within a field of interest (FOI) of a microscope. Another optional method comprises locating the integrated object within a coordinate system correlated to the slide, e.g., so that the integrated object can be subsequently located with a microscope.

In accordance with a second aspect of the present inventions, a computer readable medium for analyzing a biological specimen (e.g., a cytological specimen) on a slide is provided. The computer readable medium contains instructions, which when executed, performs the afore-described method.

In accordance with a third aspect of the present inventions, a biological screening system for analyzing a biological specimen (e.g., a cytological specimen) on a slide is provided. The system comprises an imaging station for obtaining image data frames of the biological specimen, at least one processor for performing the afore-described method, including locating the integrated object within an FOI, and an automated or semi-automated microscope for scanning a field of view (FOV) relative to the FOI to present the integrated object in each FOI.

It should be appreciated that, although the present inventions lend themselves well to the analysis of biological specimens, the present inventions may alternatively be applied to the analysis of non-biological specimens.

Other and further aspects and features of the invention will be evident from reading the following detailed description of the preferred embodiments, which are intended to illustrate, not limit, the present inventions.

BRIEF DESCRIPTION OF THE DRAWINGS

The drawings illustrate the design and utility of embodiment(s) of the invention, in which similar elements are referred to by common reference numerals. In order to better appreciate the advantages and objects of the invention, reference should be made to the accompanying drawings that illustrate the preferred embodiment(s). The drawings, however, depict the embodiment(s) of the invention, and should not be taken as limiting its scope. With this caveat, the embodiment(s) of the invention will be described and explained with additional specificity and detail through the use of the accompanying drawings in which.

DETAILED DESCRIPTION OF EMBODIMENTS

Figure 2:
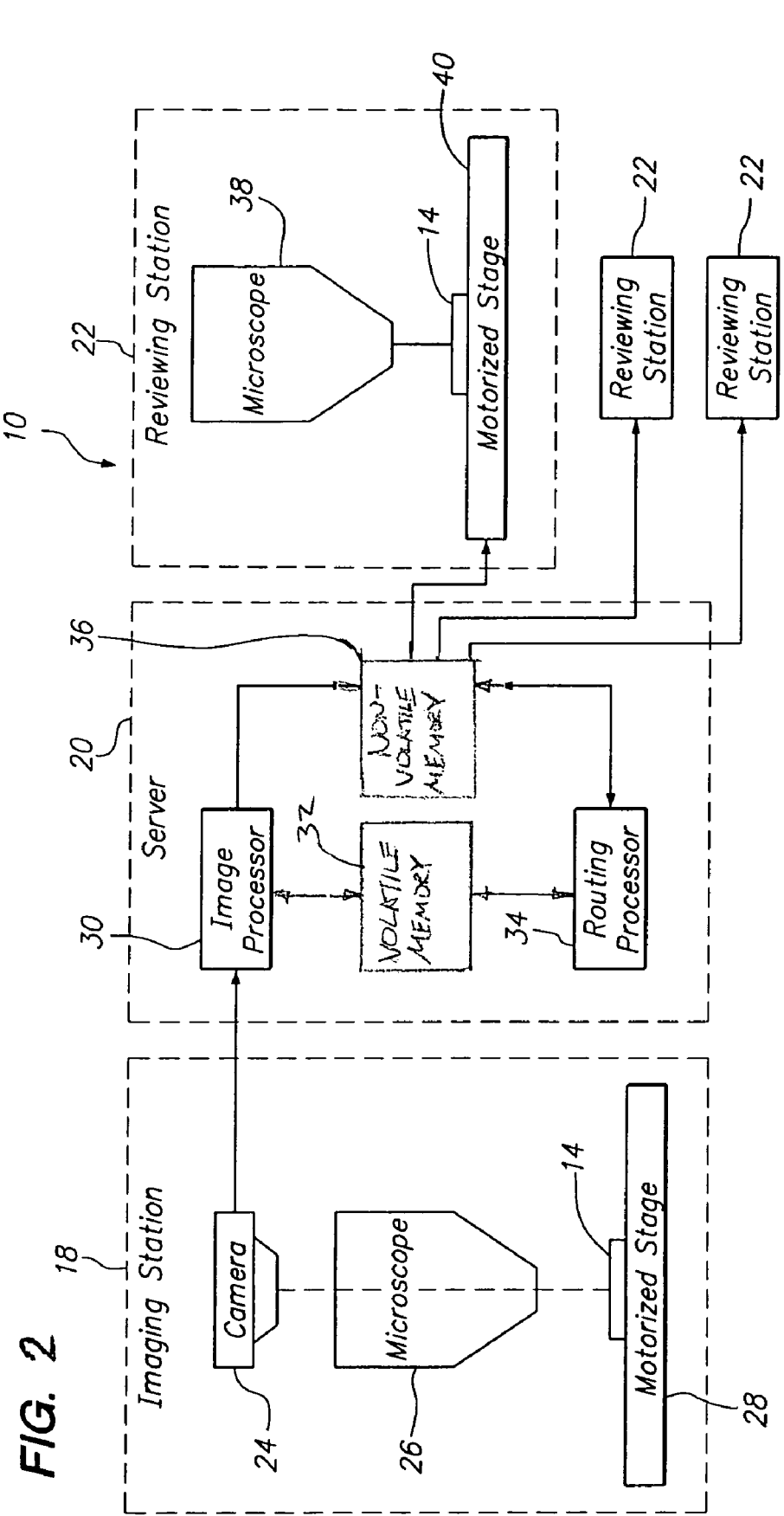
FIG. 2 is a plan view of a biological screening system constructed in accordance with one preferred embodiment of the present invention.

Referring to FIG. 2, a biological screening system 10 constructed in accordance with one preferred embodiment of the present invention is described. The system 10 is configured for presenting a biological specimen 12 located on a microscope slide 14 (best shown in FIG. 3) to a technician, such as a cytotechnologist, who can then review objects of interest (OOIs) located in the biological specimen 12. The OOIs are arranged in a number of fields of interest (FOIs) (one of which is illustrated in FIG. 4) that cover portions of the slide 14, so that the cytotechnologist's attention can be subsequently focused on OOIs within the FOIs, rather than slide regions that are not pertinent. The slide 14 is provided with fiducial marks 16, the function of which will be described in further detail below.

Although the system 10 can be used to present any biological specimen (or even a non-biological specimen, such as a computer chip) that requires further review, the system 10 lends itself particularly well to the presentation of cytological cervical or vaginal cellular material, such as that typically found on a Pap smear slide. In this case, the OOIs take the form of individual cells and cell clusters that are reviewed to check for the possible presence of an abnormal condition, such as malignancy or pre-malignancy. The biological specimen 12 will typically be placed on the slide 14 as a thin cytological layer. Preferably, a cover slip (not shown) is adhered to the specimen 12, thereby fixing the specimen 12 in position on the slide 14. The specimen 12 may be stained with any suitable stain, such as a Papanicolaou stain, e.g., a ThinPrep® stain.

The system 10 generally comprises (1) an imaging station 18 for obtaining images of the biological material contained on the slide 14 and generating electronic image data from the images; (2) a server 20 for filtering and processing the image data to identify OOIs; and (3) a plurality of reviewing stations 22 (3 shown), each of which provides a field of view (FOV) (illustrated in FIG. 3) that is scanned relative to each OOI in order to present the OOIs within the FOI for viewing by a cytotechnologist. The system 10 may also comprise a user interface (not shown), including a monitor, keyboard, and mouse (all not shown), so that the cytotechnologist can interact with the system 10.

The imaging station 18 is configured to image the slide 14, which is typically contained within a cassette (not shown) along with other slides. During the imaging process, the slides are removed from the respective cassettes, imaged, and then returned to the cassettes in a serial fashion. In the illustrated embodiment, the imaging station 18 is capable of processing up to 10 cassettes, each holding up to 25 slides, in about 16 hours.

The imaging station 18 comprises a camera 24, a microscope 26, and a motorized stage 28. The camera 24 captures magnified image frames of the slide 14 through the microscope 26. The camera 24 may be any one of a variety of conventional cameras, such as a charge coupled device (CCD) camera, which alone or in conjunction with other components, such as an analog-to-digital (A/D) converter, can produce a digital output of sufficient resolution to allow processing of the captured images, for example a digital image having a resolution of 640×480 pixels. Preferably, each pixel is converted into an eight-bit value (0 to 255) depending on its optical transmittance, with "00000000" being the assigned value for least amount of light passing through the pixel, and "11111111" being the assigned value for a greatest amount of light passing through the pixel.

The slide 14 is mounted on the motorized stage 28, which scans the slide 14 relative to the viewing region of the microscope 26, while the camera 24 captures images over various regions of the biological specimen 12. The shutter speed of the camera 24 is preferably relatively high, so that the scanning speed and/or number of images taken can be maximized. The motorized stage 28 keeps track of the x-y coordinates of the images as they are captured by the camera 24. For example, encoders (not shown) can be coupled to the respective motors of the motorized stage 28 in order to track the net distance traveled in the x- and y-directions during imaging. These coordinates are measured relative to the fiducial marks 16 affixed to the slide 14 (shown in FIG. 3). As will be described in further detail below, these fiducial marks 16 will also be used by the reviewing station 22 to ensure that the x-y coordinates of the slide 14 during the review process can be correlated to the x-y coordinates of the slide 14 obtained during the imaging process.

Figure 1:
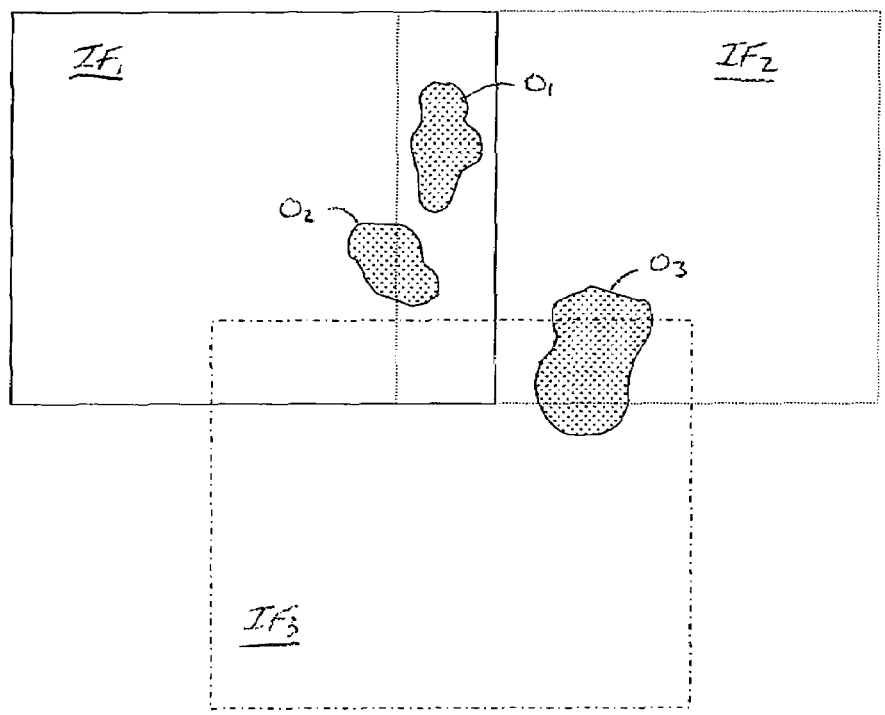
FIG. 1 is a plan view of image data frames generated by a prior art imaging system, particularly illustrated in plurality of fully contained and partially contained objects for examination.
Figure 5:
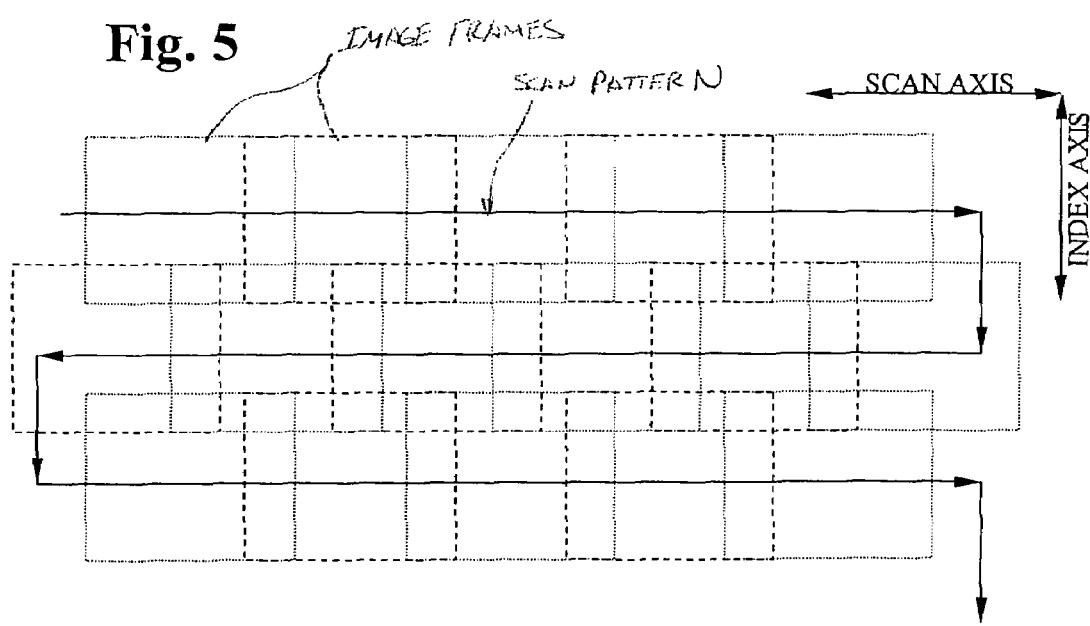
FIG. 5 is a schematic of a scan pattern used by the system of FIG. 2 to generate a series of image data frames.

As illustrated in FIG. 5, the slide 14 is imaged in a zig-zag pattern, i.e., the slide 14 is scanned along the scan axis (horizontally) to create a first row of image data frames, offset along an index axis (vertically), scanned along the scan axis (horizontally) again to create a second row of image data frames, and so on. To ensure that every portion of the biological specimen is scanned, and to compensate for mechanical scanning errors, an overlapping factor is built into the image data frames IF.

Among other processing components not pertinent to an understanding of the present invention, the server 20 comprises (1) an image processor 30 that is configured to identify, locate, and rank the OOIs within the image data frames IF acquired from the camera 24; (2) a memory 32, preferably in the form of a volatile memory, such as random access memory (RAM), for storing image data frames IF, OOI information, and any other information temporarily by the image processor 30; (3) a routing processor 34, which is configured to map the routing path that the reviewing station 22 will use to scan from one OOI to the next; and (4) a memory 36, preferably in the form of non-volatile memory, such as a hard disk drive or digital disk drive, configured for storing the location, ranking, and routing path of the OOIs. It should be appreciated that the functions performed by the respective processors 30 and 34 can be performed by a single processor, or alternatively, performed by more than two processors. Likewise, it can be appreciated that the memories 32 and 36 can be divided into several memories.

Referring back to FIG. 2, in one preferred embodiment, a total of three reviewing stations 20 are shown coupled to the server 20, so that up to three cytotechnologists have simultaneous access to the pertinent information stored in the server 20. Notably, the system 10 can typically process the slides 12 much quicker than a cytotechnologist can review them. Even if the specimen processing speed of the system 10 is slower than the specimen review speed of a cytotechnologist, the system 10 can generally be operated 24 hours a day, whereas the typical cytotechnologist will only work 8 hours a day. Thus, the bottleneck in the screening process occurs at the human level, i.e., the detailed review of the biological material contained on the slides 12. Thus, it can be appreciated that the use of multiple reviewing stations 20 alleviates this bottleneck, thereby providing for a much more efficient process.

Figure 3:
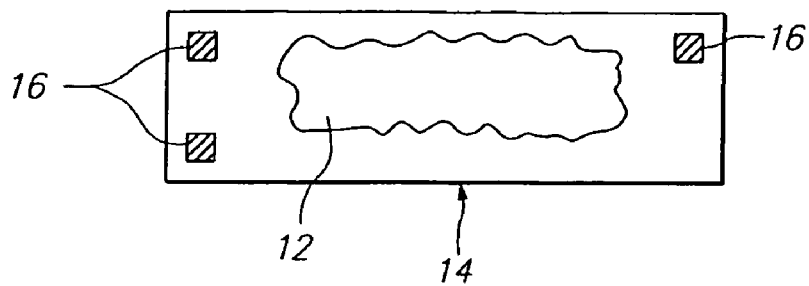
FIG. 3 is a plan view of a standard microscope slide carrying a biological specimen.
Figure 4:
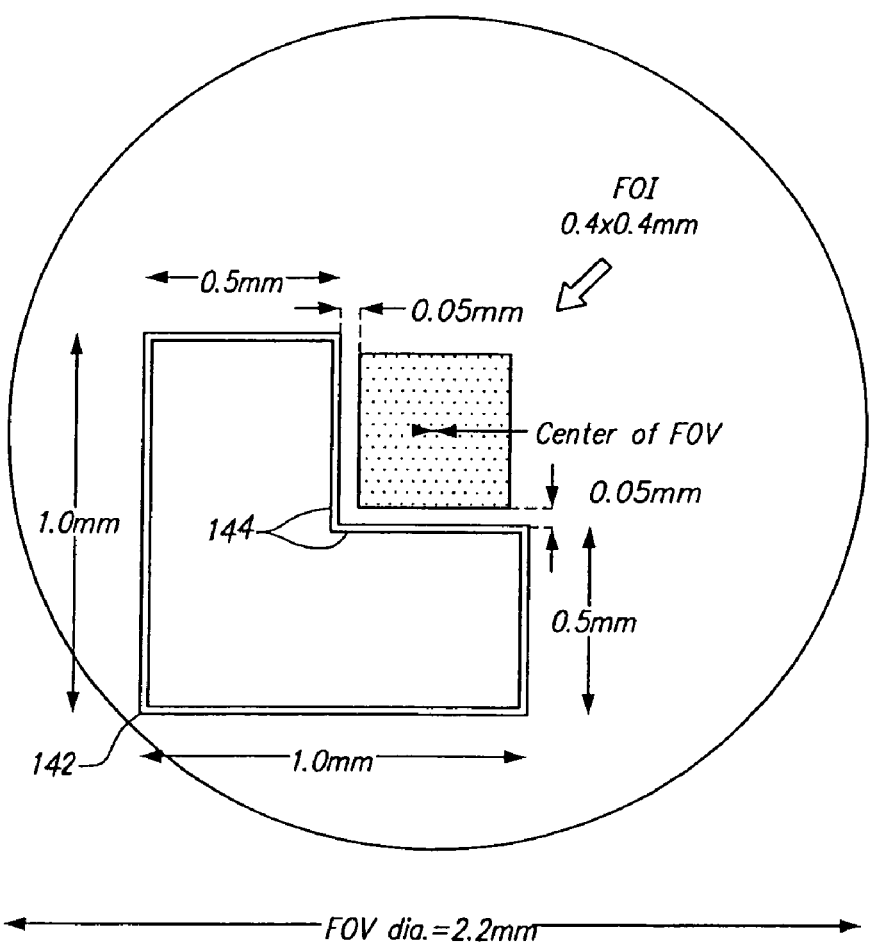
FIG. 4 is a view of a field of interest (FOI) and marker indicator as shown through a field of view (FOV) of a microscope used in the system of FIG. 2.

Before discussing the details of the reviewing stations 20, reference is made to FIG. 3, which illustrates an exemplary FOV that each reviewing station centers over a FOI. In the illustrated embodiment, the FOV has a diameter of 2.2 mm, and the FOI is defined by a 0.4 mm×0.4 mm square circumscribed by the FOV. In the actual embodiment, the borders of the FOI are imaginary and cannot be seen, so that the cytotechnologist's view of any OOIs is not obstructed. In order to more quickly direct the cytotechnologist's attention to the FOI and to provide a reference that generally indicates the exact region bound by the imaginary borders of the FOI, an L-shaped mark indicator 42 is provided. The mark indicator 42 captures the FOI (i.e., an open square portion 44 of the mark indicator 42 borders the left and bottom sides of the FOI). A 0.05 mm margin is provided between the mark indicator 42 borders and the imaginary borders of the FOI, so that the portions of OOIs extending outside of the left and bottom borders of the FOI (resulting from an OOI that is included within the FOI, but centered near the left or bottom border of the FOI) will not be obstructed by the mark indicator 42. The mark indicator 42 also serves to provide a means for the cytotechnologist to electronically mark the FOI (e.g., by pushing a button that electronically colors the mark indicator 42) as requiring further review by a pathologist (e.g., if an OOI has malignant or pre-malignant attributes).

Referring back to FIG. 2, each reviewing station 20 comprises a microscope 38 and a motorized stage 40. The slide 14 (after image processing) is mounted on the motorized stage 40, which moves the slide 14 relative to the viewing region of the microscope 38 based on the routing plan and a transformation of the x-y coordinates of the FOIs obtained from memory 36. Specifically, these x-y coordinates, which were acquired relative to the x-y coordinate system of the imaging station 18, will be transformed into the x-y coordinate system of the reviewing station 20 using the fiducial marks 16 affixed to the slide 14 (shown in FIG. 3). Thus, it is ensured that the x-y coordinates of the slide 14 during the reviewing process are correlated to the x-y coordinates of the slide 14 during the imaging process. The motorized stage 40 will then move in accordance with the transformed x-y coordinates of the FOIs, as dictated by the routing plan.

In the illustrated embodiment, to advance from one FOI to another, the cytotechnologist presses an activation switch (not shown). In this sense, the reviewing station 20 is semi-automatic. Alternatively, the FOIs are automatically advanced from one to the next. In this case, the motorized stage 40 may optionally pause for a predetermined amount of time for each FOI. In this sense, the reviewing station 20 is fully automatic.

As the selected FOIs are presented in the FOV of the microscope 38, the cytotechnologist reviews the FOIs and makes decisions about the level of cell abnormality, if any. The cytotechnologist will electronically mark any FOIs that are suspect. The cytotechnologist is capable of returning to a previously viewed FOI, and manually moving to (and viewing) locations on the slide not encompassed by FOIs. Following review of the slide 14, if any FOIs have been marked by the cytotechnologist, the reviewing station 22 preferably automatically scans the entire biological specimen 12, so that 100% viewing coverage is ensured. The cytotechnologist is able to pause the autoscan and to move the stage 40 in order to reposition and access locations on the slide 14, as desired.

Figure 6:
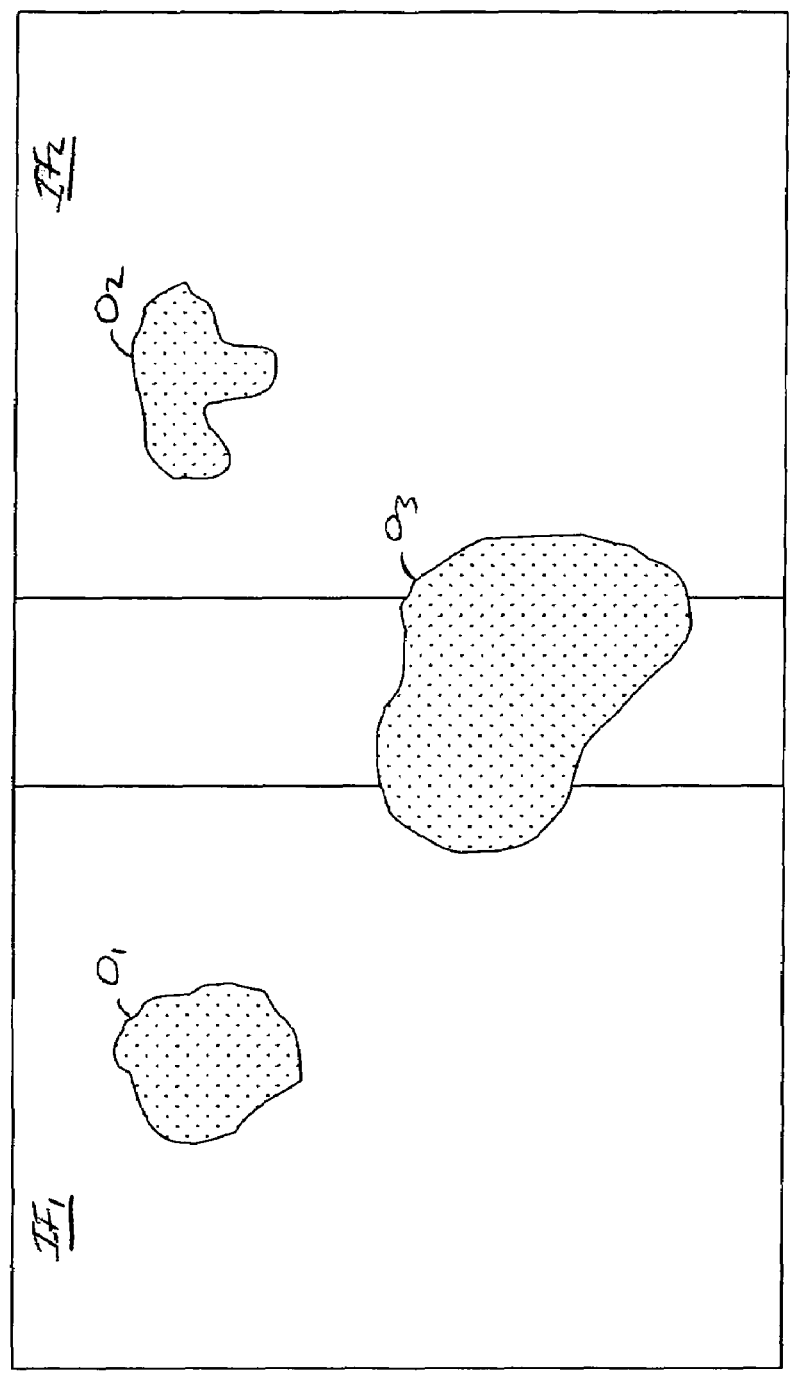
FIG. 6 is a plan view showing two image data frames in which there are a fully contained object and a partially contained object.

Now describing the imaging station 18 in further detail, the image processor 30 is configured to identify and locate objects that are entirely contained within at least one image data frame IF (referred to as "fully contained objects"), and analyze the attributes of these objects to identify OOIs to be subsequently located within FOIs of one of the review stations 22. The image processor 30 is also configured to identify and locate objects that are not entirely contained within at least one of the image data frames IF (referred to as "partially contained objects"), and analyze the attributes of these objects to identify OOIs to be subsequently located within FOIs of one of the review stations 22. For example, FIG. 6 illustrates an exemplary pair of adjacent image data frames $IF_1$ and $IF_2$. As there shown, objects $O_1$ and $O_2$ are entirely contained within image data frames $IF_1$ and $IF_1$, respectively. Even though image data frames $IF_1$ and $IF_2$ overlap each other, object $O_3$ is not entirely contained within either of the image data frames $IF_1$ and $IF_2$. It is these partially contained objects that are either ignored later in the analysis process or may be analyzed inaccurately.

Figure 7:
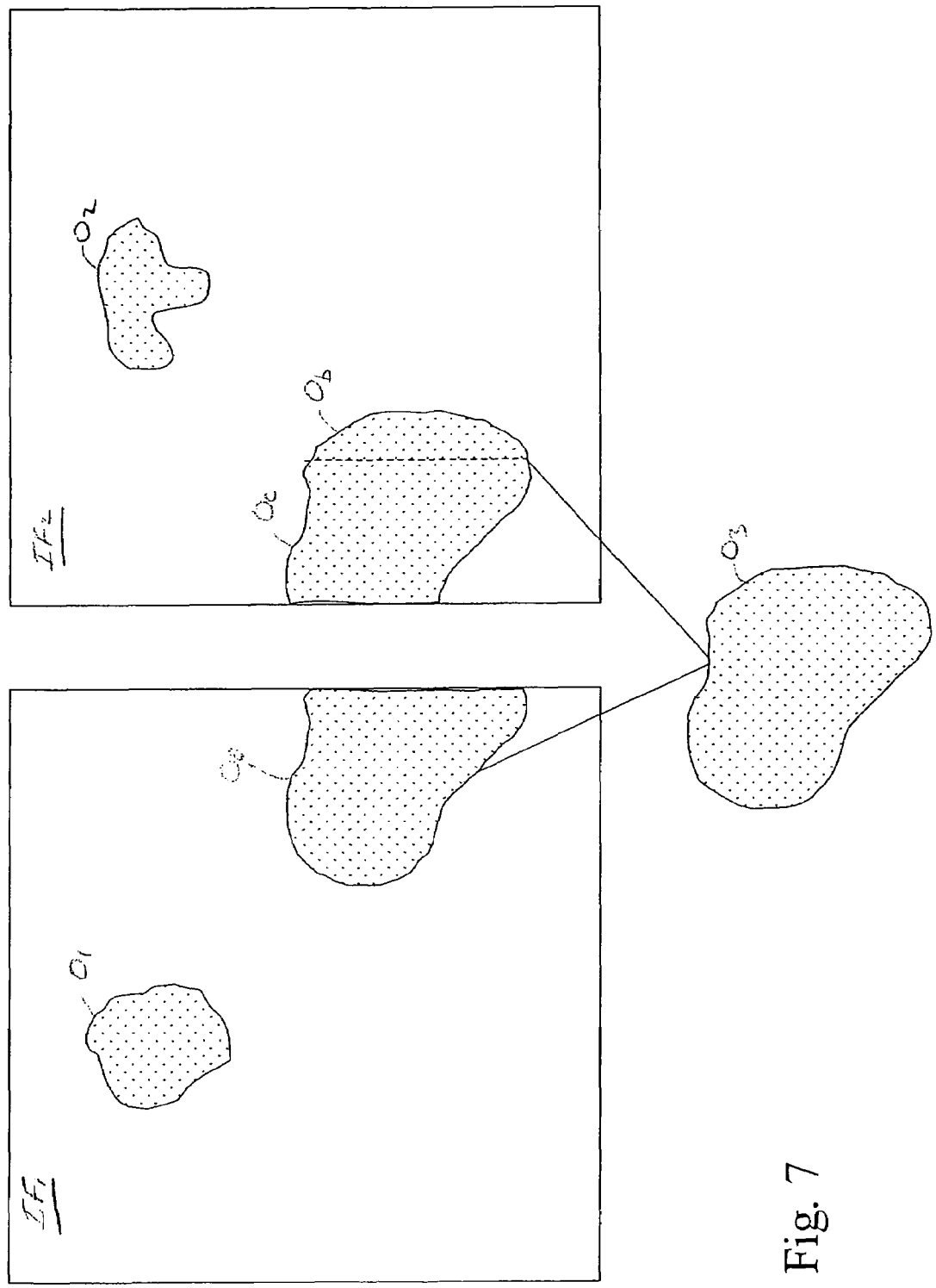
FIG. 7 is a plan view of the two images data frames of FIG. 6, particularly illustrating reconstruction of the partially contained object using its complementary portions.

To compensate for this, the image processor 30 is also configured for matching the complementary portions these objects respectively located in different ones of the image data frames to create fully integrated objects. In the case illustrated in FIG. 7, the complementary portions $O_a$ and $O_b$ are matched to reconstruct the fully integrated version of object $O_3$. Note that the portion $O_c$ is common to both image data frames $IF_1$ and $IF_1$, and is thus, not used in the reconstruction.

The image processor 30 is also configured to analyze the attributes of the objects (both entirely contained objects and reconstructed objects) to identify and rank OOIs that are subsequently located within FOIs of the review stations 22. In one embodiment, each OOI will be assigned to a FOI, with the nominal center of the respective OOI serving as the center of the FOI. In alternative embodiments, an optional FOI assignment processor (not shown) can be used to assign one or more OOIs to a FOI in order to maximize the coverage of the OOIs with a predetermined number of FOIs. Details regarding this alternative methodology are disclosed in U.S. patent application Ser. No. 10/866,397, entitled "Method and System for Organizing Multiple Objects of Interest in Field of Interest," which is expressly incorporated herein by reference.

Figure 8A:
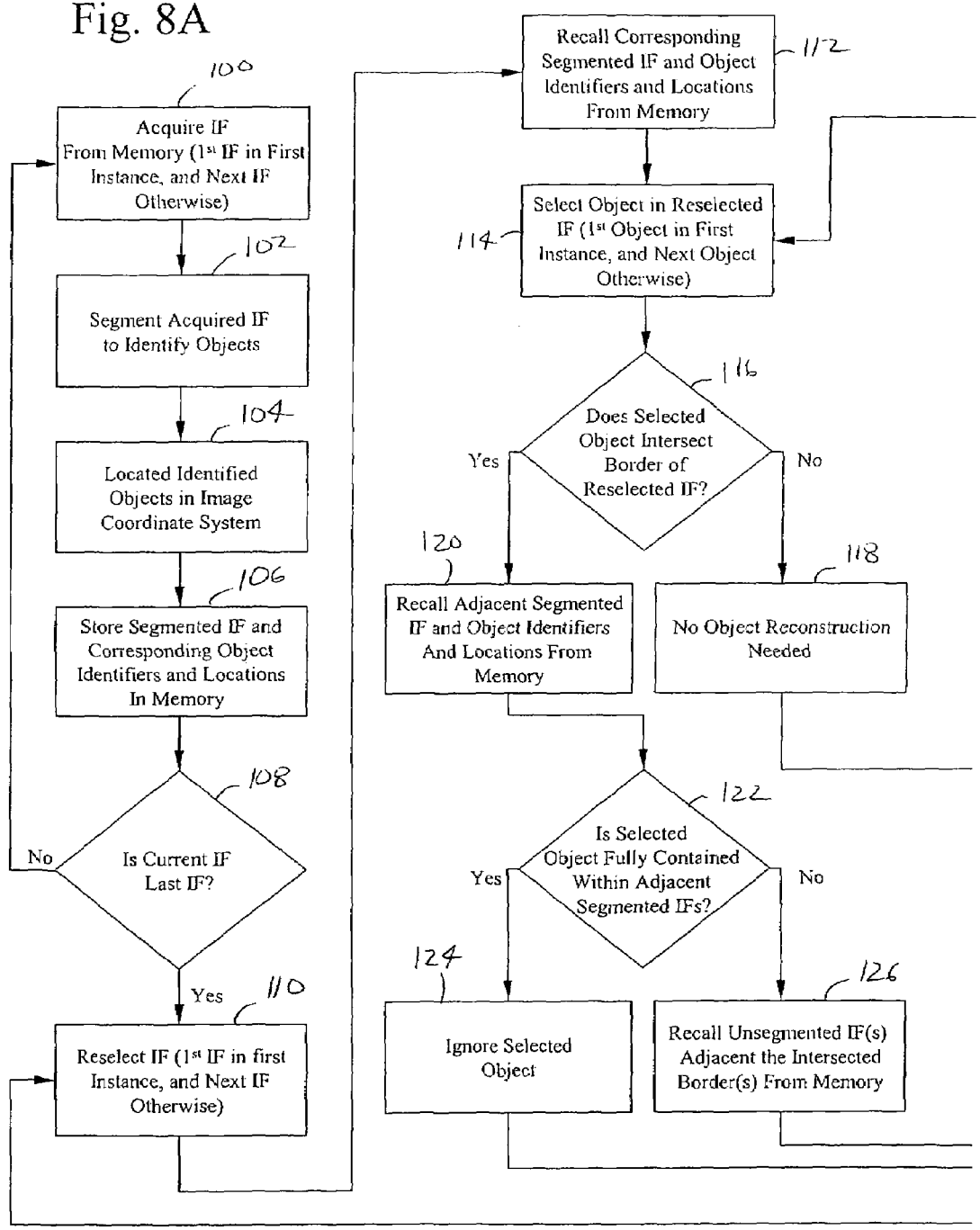
FIG. 8 is a flow diagram of one preferred process used by an image processor of the system of FIG. 2 to examine image data frames for objects of interest.
Figure 8B:
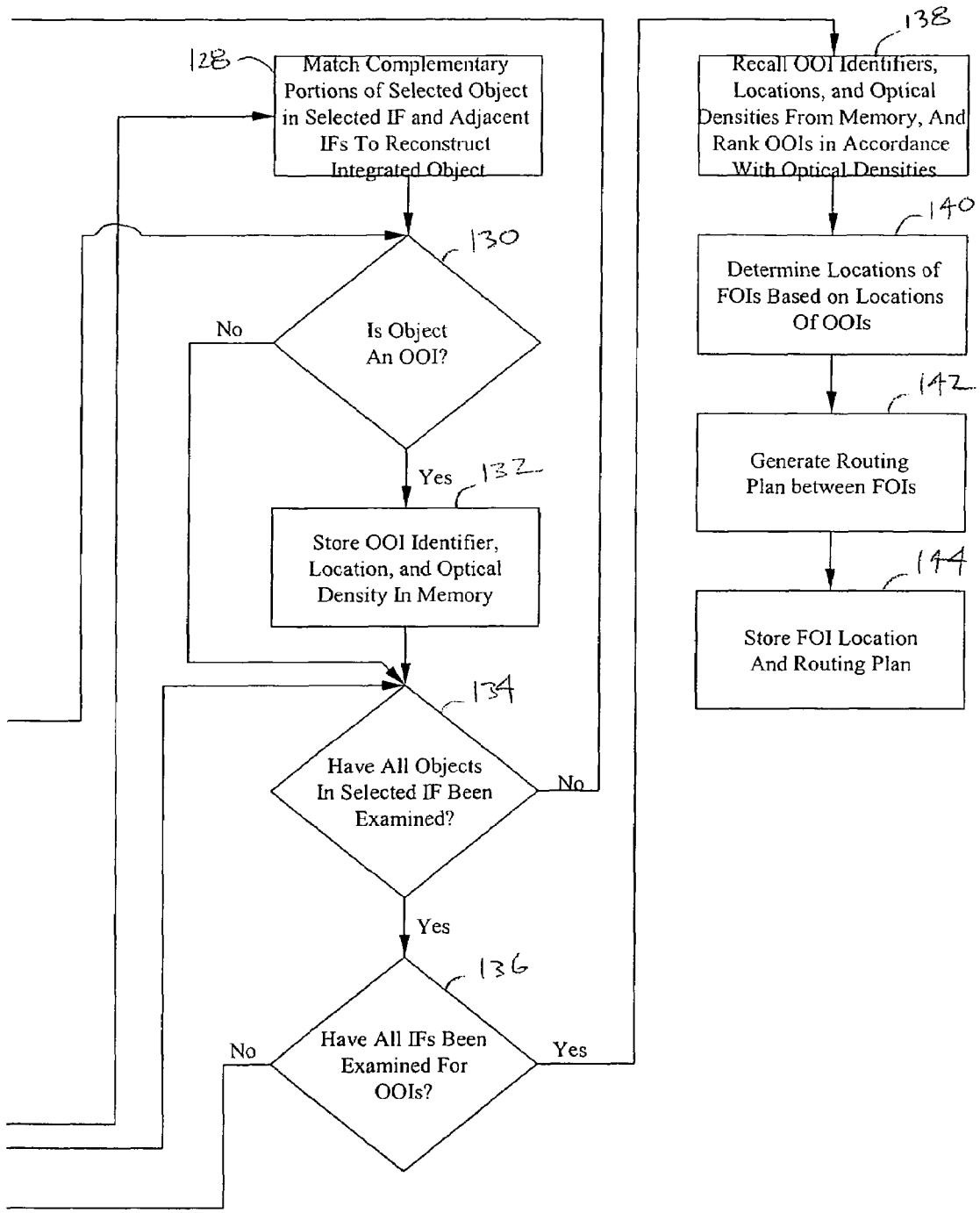

Referring now to FIG. 8, one methodology to identify, locate, and rank OOIs within the image data frames, and to create a FOIs and a routing path between the FOIs, will now be discussed in greater detail. Prior to initiation of the described method, all image data frames taken of the biological specimen 12 are stored in the volatile memory 32 for acquisition by the image processor 30 prior to initiating processing of these image data frames. Alternatively, the image data frames can be, at least, initially processed as the image data frames are taken of the specimen 12. In either event, the image data frames can either be stored within the volatile memory 32 directly from the imaging station 18, or stored within the non-volatile memory 36 directly from the imaging station 18, and then recalled and stored within the volatile memory 32 just prior to processing. In either event, the image data frames are preferably stored in the volatile memory 32 in some fashion that allows the image processor 30 to selectively and efficiently acquire any image data frame.

When the initial data frame acquired of the biological specimen 12 is available, the image processor 30 acquires an image data frame from the volatile memory 32, which will be the first image data frame in the first instance, and the next image data frame otherwise (action block 100). Next, the image processor 30 identifies relevant objects within the acquired image data frame, e.g., those objects that are most likely to be cellular objects (action block 102). The image processor 30 may identify relevant objects within the image data frame using standard background correction and object segmentation techniques.

In one method, the image processor 30 obtains background illumination values for each pixel location in the image data frame from a previously imaged verification slide, and uses these background illumination values as an amplifier for compensating the actual pixel values of the image data frame, resulting in a background corrected image data frame, which can be stored in the volatile memory 32, replacing the corresponding uncorrected image data frame.

In a first primary segmentation operation, the image processor 30 removes artifacts from further consideration. The image processor 30 accomplishes this by masking pixels in the background corrected image data frame from further consideration that, by virtue of their lightness, are unlikely to be cell nuclei. The remaining pixels in the background corrected image data frame form "blobs" having all manner of shapes and sizes. The image processor 30 then performs an erosion process on the blobs in order to remove from further consideration blobs that are only a few pixels in diameter and narrow strands extending from blobs or connecting adjacent blobs. The image processor 30 then determines whether each blob in the image is an individual object or a clustered object, depending on the number of pixels in the blob. For example, a blob having more than 500 pixels might be considered a clustered object, whereas a blob having 500 or less pixels might be considered an individual object. For individual objects, blobs that do not meet certain criteria related to total area, perimeter to area ratio, optical density standard deviation, and grayscale mean pixel value are not further considered.

In a secondary segmentation operation, the image processor 30 removes blobs that are unlikely to be individual cells or clustered cells, resulting in a segmented image data frame. For individual objects, the image processor 30 performs a series of erosion operations, which remove small objects and eliminates projections from the remaining blobs, and dilation operations, which remove holes from the remaining blobs. For clustered objects, the image processor 30 sharpens the edges of the object to provide a defined border. From the defined clustered object, the image processor 30 then selects an individual object or objects having the highest integrated optical density. The individual objects extracted from clusters objects will be flagged as cluster-extracted objects.

Figure 9:
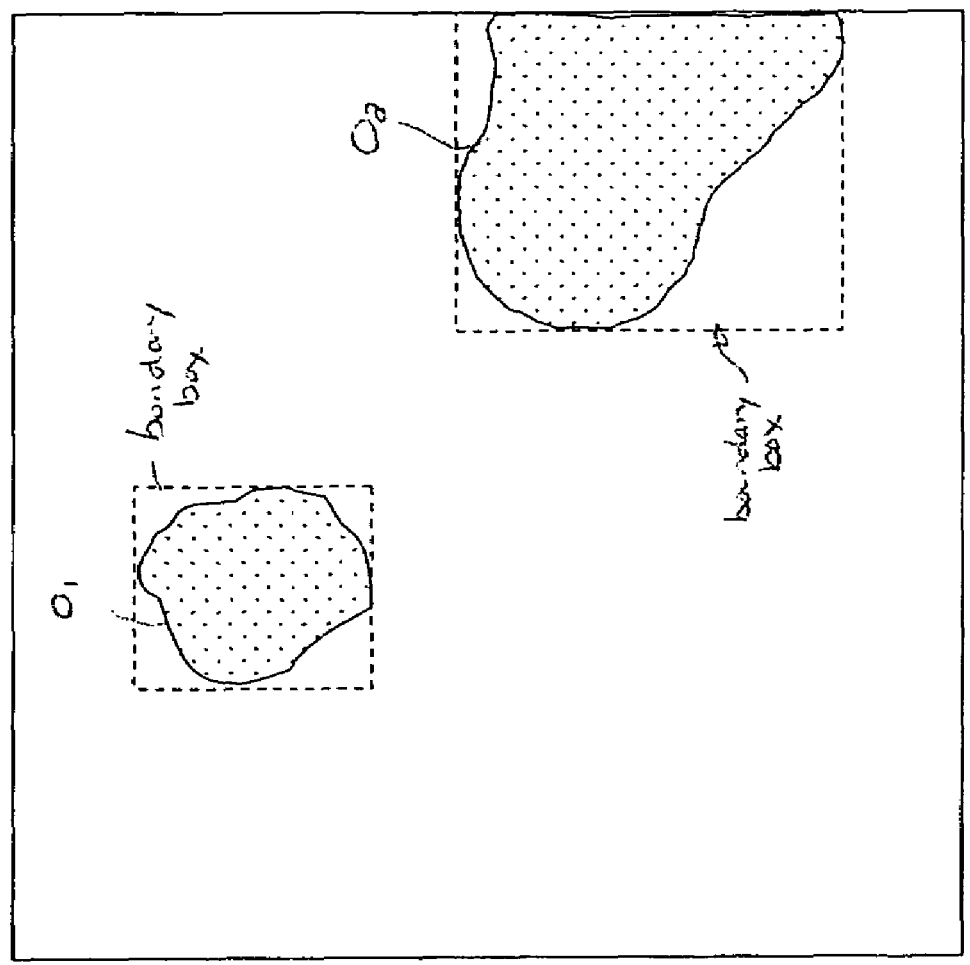
FIG. 9 is a plan view showing one method of locating identified objects within an image coordinate system.

Next, the image processor 30 locates the relevant objects within the imaging coordinate system (action block 104). The image processor 30 accomplishes this by creating boundary boxes around each of the relevant objects, as illustrated in FIG. 9, and then identifying the center of mass of the contained object as its location. Because the boundary boxes are correlated to the imaging coordinate system used to register the image data frames, the center of the boundary box represents the x-y coordinate of the respective object within the imaging coordinate system. The image processor 30 then stores the segmented image data frame, along with the identifiers (e.g., index numbers) and corresponding locations (e.g., x-y coordinates) of the relevant objects, within the volatile memory 32 (action block 106).

The image processor 30 then identifies relevant objects within the remaining image data frames by repeating action blocks 100-106, resulting in the storage of segmented image data frames and the corresponding identifiers and locations of the relevant objects within the volatile memory 32 for all image data frames. That is, if the currently acquired image data frame is not the last image data frame of the biological specimen 12 (decision block 108), the image processor 32 processes the next image data frame in accordance with action blocks 100-106.

After the relevant objects have been identified and located in all of the original image data frames, the image processor 30 evaluates the objects (whether individual objects or clustered objects), classifying certain of those objects as OOIs. In performing this function, the image processor 30 reselects an image data frame, which will be the first image data frame in the first instance, and the next image data frame otherwise (action block 110). The image processor 30 then recalls the corresponding segmented image data frame, and the relevant object identifiers and locations from the volatile memory 32 (action block 112).

Using the recalled identifiers and locations of the objects, the image processor 30 examines the reselected image data frame to identify those objects that are fully contained within the reselected image data frame. For those objects that are not fully contained within the reselected image data frame, the image processor 30 determines if these objects are fully contained within adjacent image data frames, and if not, reconstructs the objects using the object portions in the reselected image data frame and adjacent image data frames. Regardless of whether the object is a fully contained object or a reconstructed object, the image processor 30 can measure various features of the selected object, and then calculate an object score based on the measured values of these features. Based on this score, the image processor 30 can then classify the respective object either as an artifact that is not further considered or as an OOI that is further considered, with individual objects representing individual OOIs (IOOIs) and clustered objects representing clustered OOIs (COOIs).

The image processor 30 may accomplish these functions on an object-by-object basis. In particular, the image processor 30 selects an object within the reselected image data frame, which will be the first object in the first instance, and the next object otherwise (action block 114), and determines if the selected object intersects any border of the image data frame (decision block 116). If the selected object does not intersect any border of the image data frame, the selected object is deemed a fully contained object that needs no reconstruction (action block 118). If the selected object does intersect one or more borders of the image data frame, the image processor 30 recalls from the volatile memory 32 the segmented image data frame(s) adjacent to the intersected border(s), along with the identifiers and locations of the relevant objects within the recalled segmented image data frame(s) (action block 120), and determines if the selected object is fully contained within the adjacent image data frame(s) (decision block 122). Notably, up to three other adjacent image data frame(s) can potentially fully contain the selected object.

If the selected object is fully contained within any adjacent image data frame, the selected object is ignored (action block 124), since the selected object will be considered when the adjacent image data frame is subsequently selected for further processing. If the selected object is not fully contained within the adjacent image data frame(s), the image processor 30 reconstructs the selected object from scratch. In particular, the image processor 30 obtains the background corrected image data frames adjacent the intersected border(s) from the volatile memory 32 (action block 126). Alternatively, the corresponding original (unsegmented) image data frames can be obtained. Then, the image processor 30 matches the complementary portions of the object contained within the reselected image data frame and adjacent image data frame(s), thereby creating a fully integrated object (action block 128). In an optional method, identification and reconstruction of a partially contained object is only performed if the complementary portion of the object within the currently selected image data frame is greater than a particular size. In this manner, unnecessary reconstruction and processing of irrelevant objects may be eliminated.

Whether the selected object is a fully contained object or is a reconstructed object, the image processor 30 then determines if the selected object is an OOI, e.g., in the manner described above (decision block 130). If the selected object is an OOI, the image processor 30 measures the nuclear integrated or average optical density of the OOI, and stores an identifier (e.g., index number) of the OOI, the x-y coordinates of the OOI, and the measured optical density in the volatile memory 32 (action block 132). Optionally, the OOI information obtained from fully contained objects can be stored separately from OOI information obtained from reconstructed objects. Notably, if any of the individual complementary portions of a partially contained object have been analyzed and determined to be an OOI, these results are deleted from the non-volatile memory 32, since the results from the analysis of the integrated object created from the individual complementary portions will presumably be more accurate.

After the OOI information has been stored, or if the selected object is not an OOI as determined in decision block 130, or if the selected object is ignored at action block 124, the image processor 30 then determines if all objects in the reselected image data frame have been examined (decision block 134). If all objects in the selected image data frame have not been examined, the image processor 30 selects another object for examination (action block 114). If all objects in the reselected image data frame have been examined, the image processor 30 determines if all of the image data frames have been examined for OOIs (decision block 136). If all image data frames have not been examined for OOIs, the image processor 30 repeats blocks 114-134 by selecting another image data frame and examining it for OOIs. If all image data frames have been examined for OOIs, the image processor 30 recalls the OOI identifiers, x-y coordinates, and optical densities from the volatile memory 32, and ranks all of the OOIs stored in accordance with their corresponding optical densities (action block 138).

Next, image processor 30 determines the x-y coordinates of the FOIs based on the location of the ranked OOIs (action block 140). In one method, a predetermined number of FOIs are used. For example, 20 FOIs may be used to display IOOIs, and 2 FOIs may be used to display COOIs. Each FOI may be centered over a single OOI, in which case, the x-y coordinates of the center of the FOI will correspond exactly with the x-y coordinates of the corresponding OOI. Alternatively, if the optional FOI processor (not shown) disclosed in U.S. patent application Ser. No. 10/866,397, which has previously been incorporated herein by reference, is used, the x-y coordinates of each FOI can be determined, so that the respective FOI covers a group of OOIs, thereby maximizing the coverage of OOIs.

The routing processor 34 then maps the x-y coordinates of the FOIs using a suitable routing algorithm, such as a modified "traveling salesman" algorithm No need since not too important to invention, which determines the most efficient viewing route for presenting the FOIs in the reviewing station 22 (action block 142). The routing processor 34 then stores the x-y coordinates of the FOIs, along with the routing plan (which in the illustrated embodiment, is accomplished by simply placing the FOIs in a list in the order that they will be reviewed), in the non-volatile memory 36 for subsequent access by the reviewing stations 22 (action block 144).

In the method illustrated in FIG. 8, both the fully contained objects and partially contained objects are fully processed together within the respective image data frame after all of the image data frames have been initially examined to identify objects. However, the fully contained objects can be examined for OOIs as each image data frame is initially acquired by the image processor 30. In this manner, segmented image data frames, previously used for subsequent processing of the fully contained objects, need not be stored, thereby conserving space in the volatile memory 32. In addition, more of the image processing (i.e., processing of the fully contained objects) can be performed between generation of the image data frames by the imaging station 18, thereby saving total processing time.

Figure 10A:
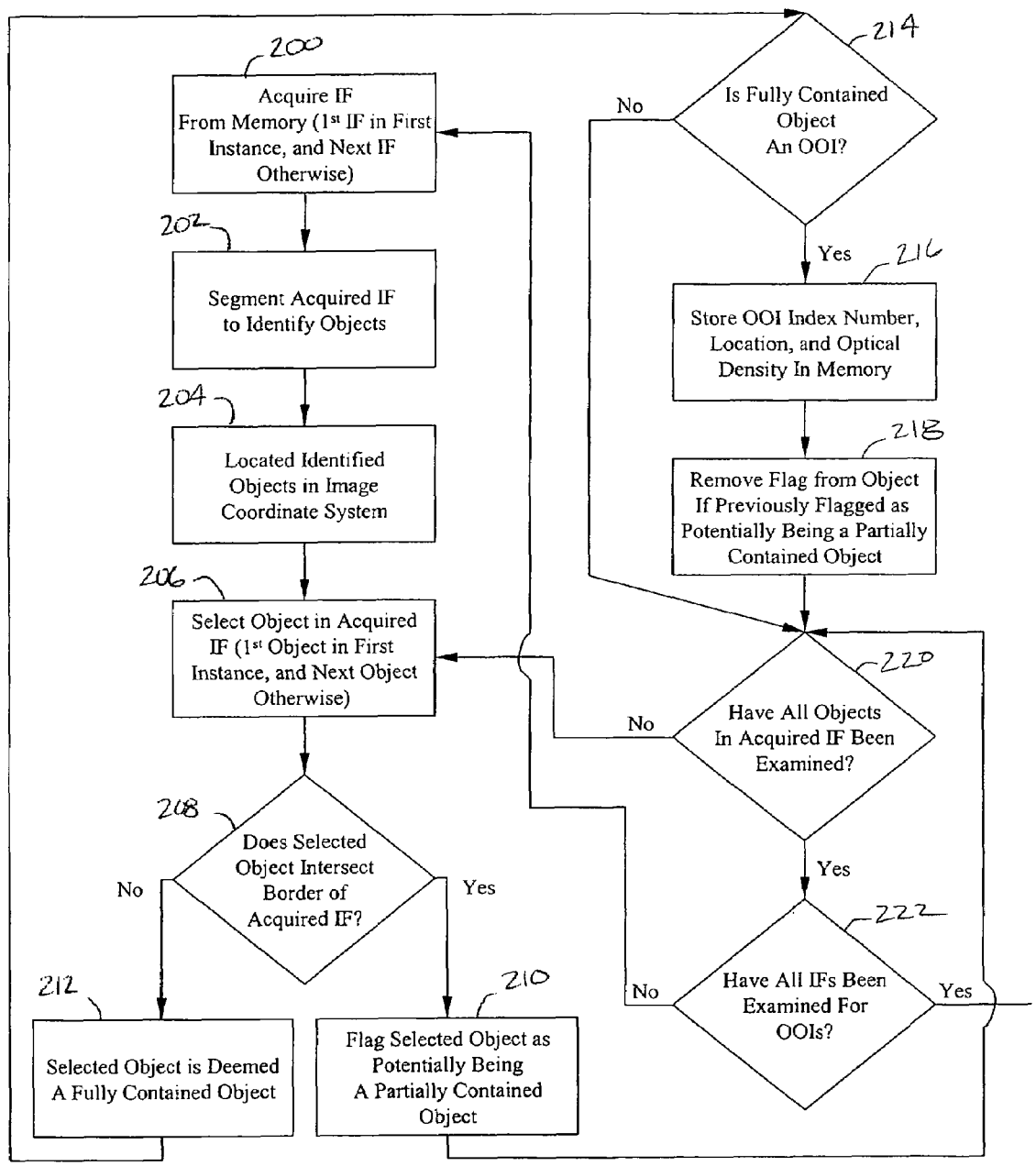
FIG. 10 is a flow diagram of another preferred process used by the image processor of the system of FIG. 2 to examine image data frames for objects of interest.
Figure 10B:
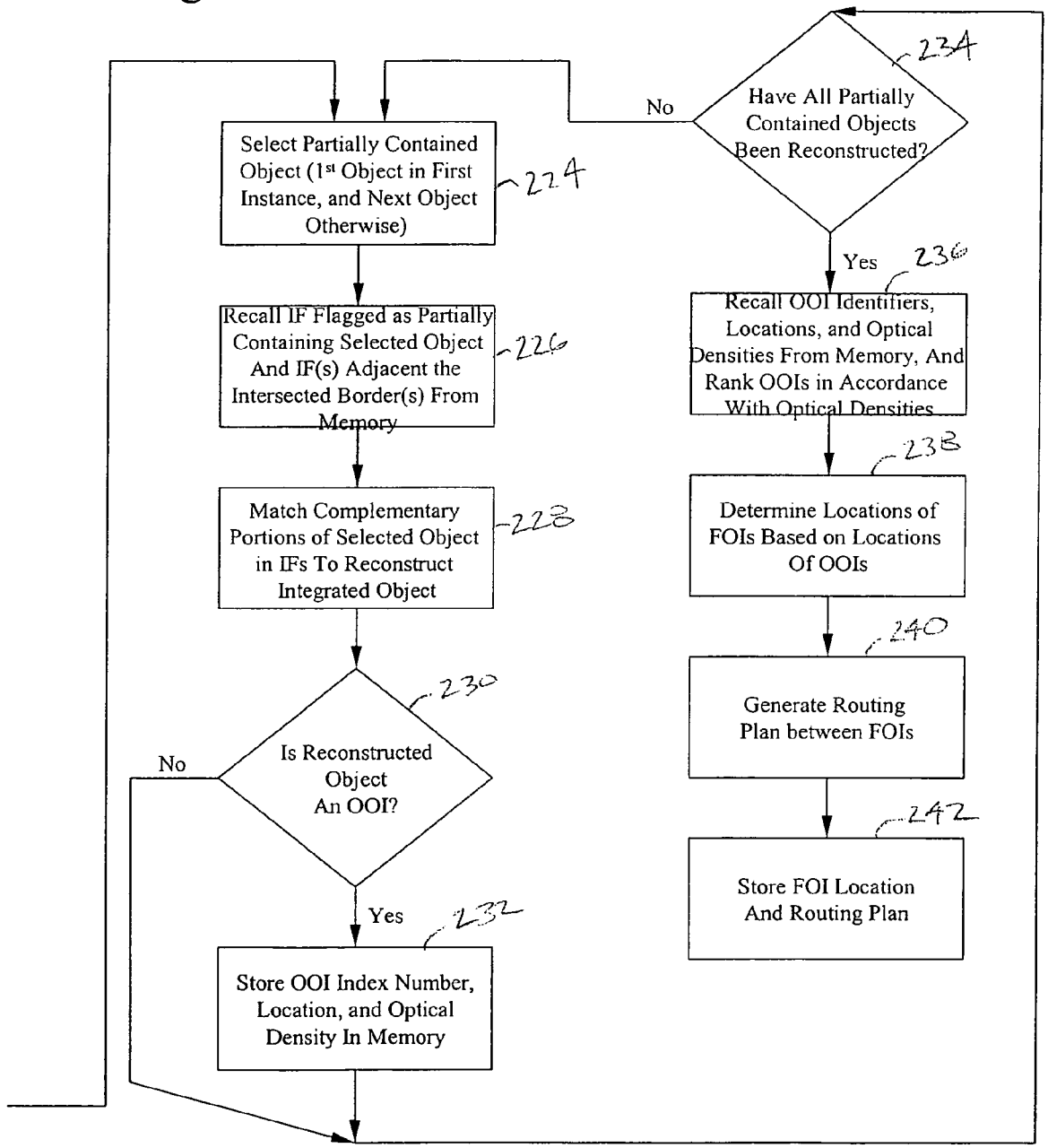

For example, referring to FIG. 10, the image processor 30 acquires an image data frame (action block 200), identifies objects in the acquired image data frame (action block 202), and locates the identified objects in the image coordinate system (action block 204) in the same manner described above with respect to action blocks 100-104. The image processor 30 then identifies those objects that are fully contained within the image data frame, and determines if the fully contained objects are OOIs. For those objects that are not fully contained within the image data frame, the image processor 30 flags these objects as possibly needing subsequent reconstruction. In an optional method, flagging of object is only performed if the complementary portion of the object within the currently acquired image data frame is greater than a particular size. In this manner, unnecessary processing of irrelevant objects may be eliminated.

The image processor 30 may accomplish these functions on an object-by-object basis. In particular, the image processor 30 selects an object within the acquired image data frame, which will be the first object in the first instance, and the next object otherwise (action block 206), and determines if the selected object intersects any border of the image data frame (decision block 208). If the selected object does intersect any border of the image data frame at decision block 208, the image processor 30 flags that object as potentially being a partially contained object (action block 210). Note that a selected object that intersects a border of an image data frame is not necessarily a partially contained object, since such object can be fully contained within another image data frame. Thus, flagging the object merely indicates the possibility that such object is a partially contained object. Flagging of the object may be accomplished simply by storing in volatile memory 32 the identifier (e.g., index number) of the object, the x-y coordinates of the object, an identifier (e.g., index number) of the image data frame, and identifiers (e.g., index numbers) of the image data frame(s) adjacent the intersected border(s).

If the selected object does not intersect any border of the acquired image data frame, the selected object is deemed a fully contained object that needs no reconstruction (action block 212), in which case, the image processor 130 then determines if it is an OOI (decision block 214). If the selected object is an OOI, the image processor 30 measures the nuclear integrated or average optical density of the OOI, and stores an identifier of the OOI, the x-y coordinates of the OOI, and the measured optical density in the volatile memory 32 (action block 216). If the selected object has been flagged during the processing of a previous image data frame as possibly being a partially contained object, the image processor 30 deletes this flag, along with any information associated with the flag (action block 218).

Next, the image processor 30 determines if all objects in the acquired image data frame have been examined (decision block 220). If all objects in the selected image data frame have not been examined, the image processor 30 selects another object for examination by repeating blocks 206-218. If all objects in the acquired image data frame have been examined, the image processor 30 determines if all of the image data frames have been examined (decision block 222). If all image data frames have not been examined, the image processor 30 repeats blocks 200-220 by acquiring another image data frame from the volatile memory 32 and examining it for fully contained OOIs and flagging any potentially partially contained objects.

If all image data frames have been examined for OOIs, the image processor 30 recalls from memory 32 the identifiers of the image data frames in which partially contained objects were found, as well as the corresponding object identifiers and x-y coordinates, and identifiers of the adjacent image data frames, and then based on this information, recalls the corresponding original (unsegmented) image data frames and adjacent original image data frames, reconstructs the partially contained objects, and determines if the reconstructed objects are OOIs.

This can be accomplished on an object-by-object basis. In particular, the image processor 30 selects an object flagged as a partially contained object, which will be the first partially contained object in the first instance, and the next partially contained object otherwise (action block 224), and then recalling the original (unsegmented) image data frame in which the object was originally flagged as being partially contained and the original image data frames adjacent the intersected border(s) from the volatile memory 32 (action block 226). These functions can be accomplished by recalling the object identifier and image data frame identifiers associated with the recalled object identifier, and then recalling the actual image data frames corresponding to the image data frame identifiers. Then, the image processor 30 matches the complementary portions of the object partially contained within the recalled image data frames, thereby creating a fully integrated object (action block 228). This can be accomplished in the same manner described above with respect to action block 128. Next, the image processor 130 determines if the reconstructed object is an OOI (decision block 230). If the reconstructed object is an OOI, the image processor 30 measures the nuclear integrated or average optical density of the OOI, and stores an identifier (e.g., an index number) of the OOI, the x-y coordinates of the OOI, and the measured optical density in the volatile memory 32 (action block 232). As discussed above, if any of the individual complementary portions of a partially contained object have been analyzed and determined to be OOIs, these results are deleted from the volatile memory 32, since the results from the analysis of the integrated object created from the individual complementary portions will presumably be more accurate.

Next, the image processor 30 determines whether all partially contained objects have been reconstructed and examined for OOIs (decision block 234). If all partially contained objects have not been reconstructed and examined for OOIs, the image processor 30 reconstructs another partially contained object and determines its status as an OOI in accordance with blocks 224-232.

If all partially contained objects have been reconstructed and examined for OOIs, the image processor 30 recalls the OOI index numbers, x-y coordinates, and optical densities (for both fully contained OOIs and reconstructed OOIs) from the volatile memory 32, and ranks all OOIs stored in accordance with their corresponding optical densities (action block 236). The image processor 30 then determines the x-y coordinates of the FOIs based on the location of the ranked OOIs (action block 238) in a manner similar to that described above with respect to action block 140. The routing processor 34 then maps the x-y coordinates of the FOIs using a suitable routing algorithm (action block 240), and stores the x-y coordinates of the FOIs along with the routing plan in the non-volatile memory 36 for subsequent access by the reviewing stations 22 (action block 242) in a manner similar to that described above with respect to action blocks 142 and 144.

In the method illustrated in FIG. 10, the partially contained objects are processed only after all of the image data frames have been examined for fully contained objects. However, like the fully contained objects, the partially contained objects may be processed as each image data frame is initially acquired by the image processor 30. In this manner, only some of the original (unsegmented) image data frames need be stored at any given time (i.e., only those image data frames containing partially contained objects that have not been reconstructed yet), thereby conserving space in the volatile memory 32. In addition, even more of the image processing (i.e., processing of the partially contained objects, in addition to the fully contained objects) can be performed between generation of the image data frames by the imaging station 18, thereby saving total processing time.

Figure 11:
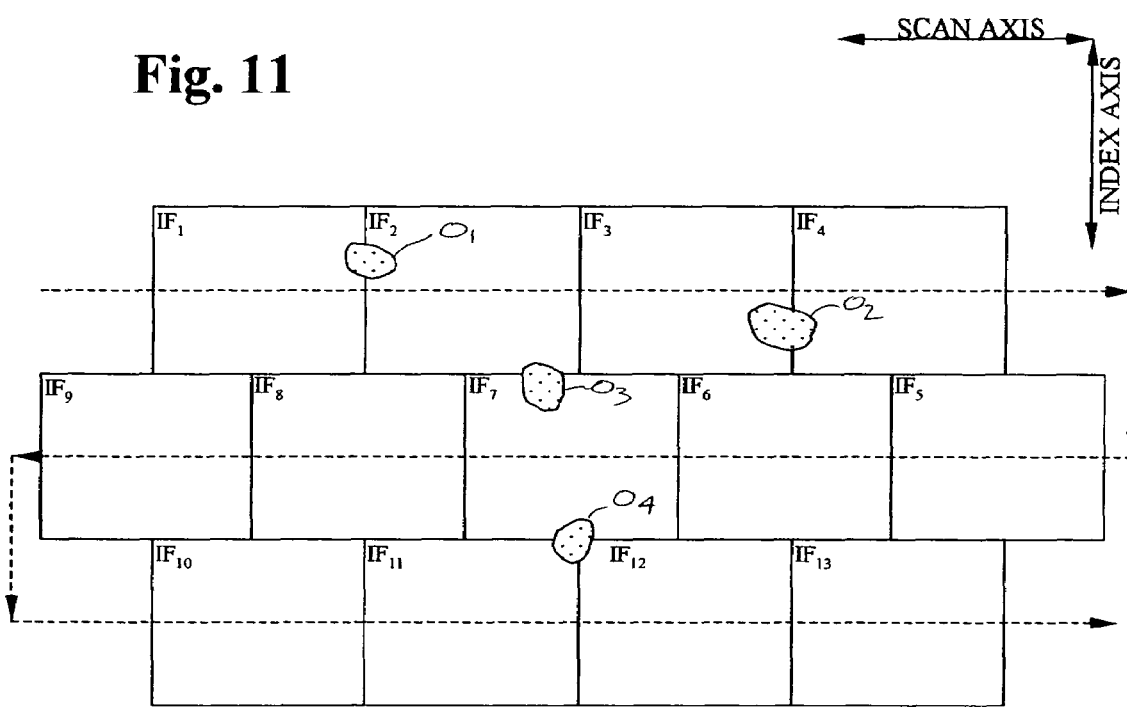
FIG. 11 is a schematic of a series of image data frames in which partially contained objects are processed in a manner that maximizes memory space and minimizes processing time.

FIG. 11 illustrates a manner in which image data frames with partially contained objects can be processed to maximize memory space. As there shown, a series of image data frames $IF_{1-13}$ are generated. For purposes of clarification, the image data frames are not shown as overlapping. Partially contained object $O_1$ intersects the left and right borders of respective image data frames $IF_1$ and $IF_2$; object $O_2$ intersects the left and right borders of respective image data frames $IF_3$ and $IF_4$; object $O_3$ intersects the bottom and top borders of respective image data frames $IF_2$ and $IF_7$; and object $O_4$ intersects the top and bottom borders of respective image data frames $IF_7$ and $IF_{11}$, the top and bottom borders of respective image data frames $IF_7$ and $IF_{12}$, and the left and right borders of respective image data frames $IF_{11}$ and $IF_{12}$.

The maximum number of image data rows that will need to be stored at one time will be three, since any particular row of image data frames may contain information required to reconstruct a partially contained object included within a row of image data frames just above the particular row and information required to reconstruct a partially contained object included within a row of image data frames just below the particular row. For example, the second row of image data frames illustrated in FIG. 11 contains information required to reconstruct partially contained objects. In particular, image data frame $IF_7$ contains information required to reconstruct object $O_3$ in image data frame $IF_2$ and object $O_4$ in image data frames $IF_{11}$, ad $IF_{12}$.

Oftentimes, however, less than three entire image data rows will need to be stored. For example, once image data frame $IF_2$ is completely processed to reconstruct object $O_1$, image data frames $IF_1$ can be deleted from memory, image data frame $IF_2$ contains no information necessary to reconstruct objects in other image data frames. Once image data frame $IF_4$ is completely processed to reconstruct object $O_2$, image data frames $IF_3$ and $IF_4$ can be deleted from memory, since they contain no information necessary to reconstruct objects in other image data frames. However, image data frame $IF_2$ cannot be deleted from memory until object $O_3$ in image data frame $IF_7$ is reconstructed. Likewise, image data frame $IF_7$ cannot be deleted from memory until object $O_4$ in image data frames $IF_{11}$ and $IF_{12}$ are reconstructed.

Figure 12A:
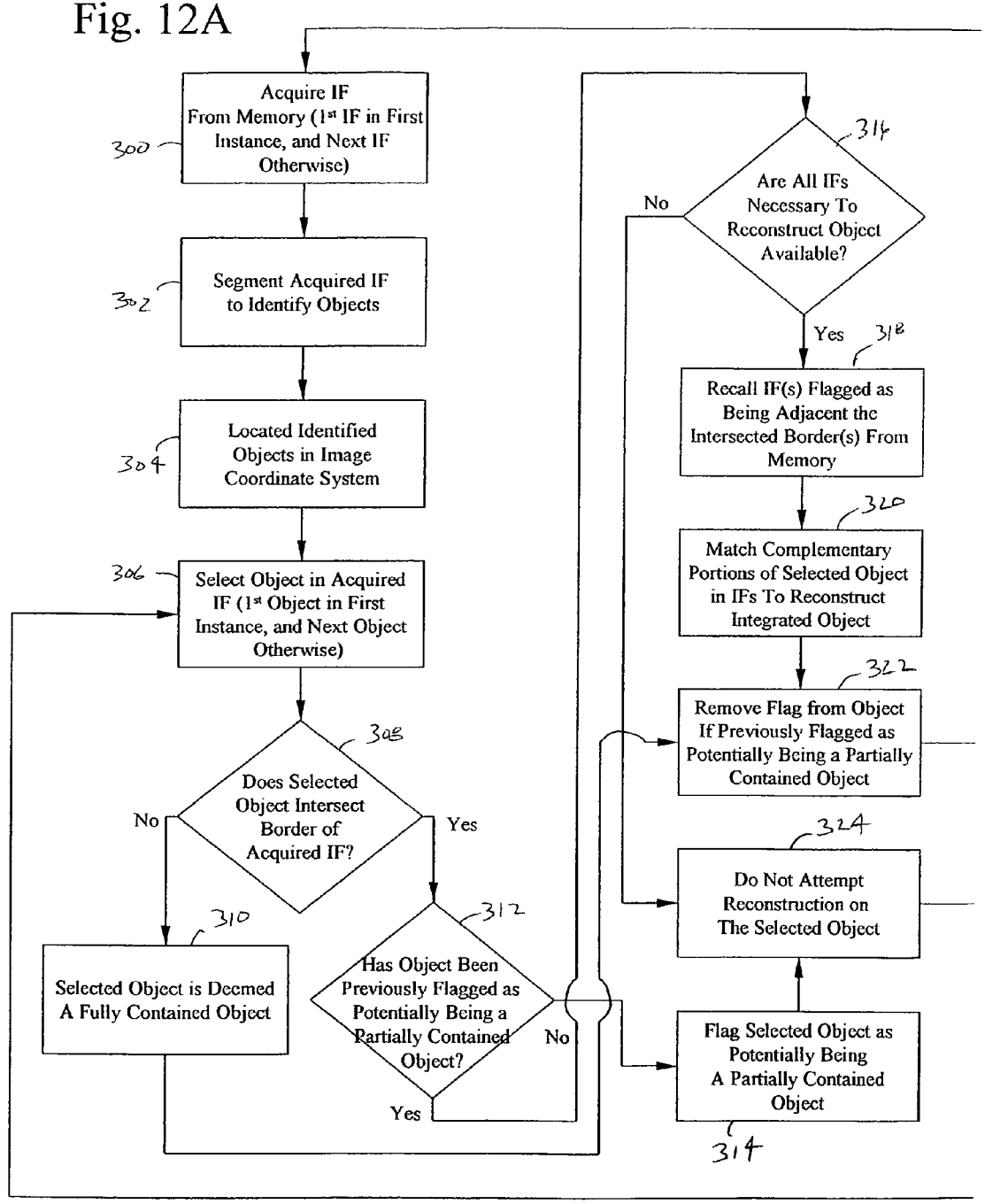
FIG. 12 is a flow diagram of still another preferred processed used by the image process of the system of FIG. 2 to examine image data frames for objects of interest in accordance with the methodology illustrated in FIG. 11.
Figure 12B:
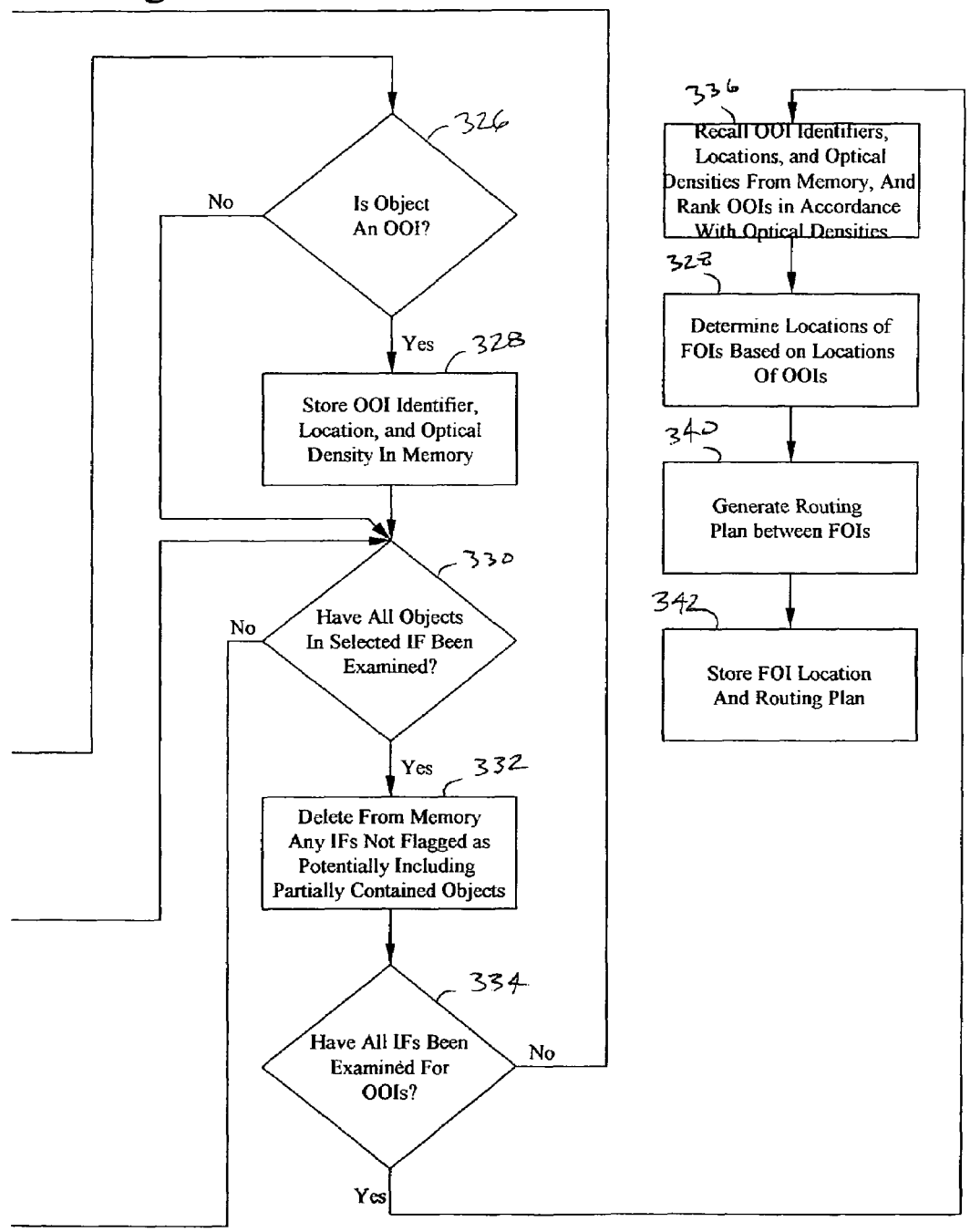

Referring now to FIG. 12, a more detailed implementation of the methodology illustrated in FIG. 11. First, the image processor 30 acquires an image data frame (action block 300), identifies objects in the acquired image data frame (action block 302), and locates the identified objects in the image coordinate system (action block 304) in the same manner described above with respect to action blocks 100-104.

The image processor 30 then identifies those objects that are fully contained within the image data frame, and reconstructs any partially contained objects if all information (i.e., the original image data frames) of the partially contained objects are available. For those objects that are not fully contained within the image data frame, and all information on the object is not available (e.g., because at least one image data frame partially containing the object has not been generated yet), the image processor 30 flags these objects as possibly needing subsequent reconstruction.

The image processor 30 may accomplish these functions on an object-by-object basis. In particular, the image processor 30 selects an object within the acquired image data frame, which will be the first object in the first instance, and the next object otherwise (action block 306), and determines if the selected object intersects any border of the image data frame (decision block 308). If the selected object does not intersect any border of the acquired image data frame, the selected object is deemed a fully contained object that needs no reconstruction (action block 310). If the selected object does intersect any border of the image data frame, the image processor 30 determines whether the object has been previously flagged as potentially being a partially contained object (decision block 312).

If the object has not been previously flagged, the image processor 30 flags that object as potentially being a partially contained object (action block 314). As previously discussed, flagging of the object may be accomplished simply by storing in volatile memory 32 the identifier (e.g., index number) of the object, the x-y coordinates of the object, an identifier (e.g., index number) of the image data frame, and identifiers (e.g., index numbers) of the image data frame(s) adjacent the intersected border. In an optional method, flagging of the object is only performed if the complementary portion of the object within the currently selected image data frame is greater than a particular size. In this manner, unnecessary processing of irrelevant objects may be eliminated.

If the object has been previously flagged, the image processor 30 determines if all image data frames necessary to reconstruct the object are available (i.e., whether these image data frames have been generated and stored) (decision block 316). If all necessary image data frames are available, the image processor 30 recalls the original image data frames flagged as being adjacent the intersected border(s) from the volatile memory 32 (action block 318). This can be accomplished by recalling the image data frame identifier(s) associated with an identifier of the object, and then recalling the actual image data frame(s) corresponding to the image data frame identifier(s). Then, the image processor 30 matches the complementary portions of the object partially contained within the currently acquired image data frame and the recalled image data frame(s), thereby creating a fully integrated object (action block 320). This can be accomplished in the same manner described above with respect to action block 128.

If the selected object has been previously flagged as possibly being a partially contained object, which will be true if the answer to decision block 312 is yes, and may or may not be true if the object was deemed a fully contained object at action block 310, the image processor 30 deletes this flag, along with any information associated with the flag (action block 322). If all necessary image data frames are not available at decision block 316, or if the object has not been previously flagged as potentially being a partially contained object at decision block 312, the image processor 30 does not attempt to reconstruct the object (action block 324).

Whether the selected object is a fully contained object or is a reconstructed object, the image processor 30 then determines if the selected object is an OOI, e.g., in the manner described above in decision block 130 of FIG. 8 (decision block 326). If the selected object is an OOI, the image processor 30 measures the nuclear integrated or average optical density of the OOI, and stores an identifier (e.g., an index number) of the OOI, the x-y coordinates of the OOI, and the measured optical density in the volatile memory 32 (action block 328). As discussed above, if any of the individual complementary portions of a partially contained object have been analyzed and determined to be OOIs, these results are deleted from the volatile memory 32, since the results from the analysis of the integrated object created from the individual complementary portions will presumably be more accurate.

After the OOI information has been stored, if the selected object is not an OOI as determined in decision block 322, or if the selected object has not been reconstructed at action block 324, the image processor 30 then determines if all objects in the currently acquired image data frame have been examined (decision block 330). If all the objects in the acquired image data frame have not been determined, the image processor 30 selects another object for examination by repeating blocks 306-328. If all objects in the acquired image data frame have been examined, the image processor 30 deletes from the volatile memory 32, any image data frames not flagged as potentially including a partially contained object (action block 332). For example, if the currently acquired image data frame only included fully contained objects, or if the there are image data frames that were used to reconstruct partially contained objects, but no longer are flagged as potentially including partially contained objects, these image data frames may be deleted from volatile memory 32.

The image processor 30 then determines if all of the image data frames have been examined for OOIs (decision block 334). If all image data frames have not been examined for OOIs, the image processor 30 repeats blocks 300-332 by selecting another image data frame and examining it for OOIs. If all image data frames have been examined for OOIs, the image processor 30 recalls the OOI index numbers, x-y coordinates, and optical densities (for both fully contained OOIs and reconstructed OOIs) from the volatile memory 32, and ranks all of the OOIs stored in accordance with their corresponding optical densities (action block 336). The image processor 30 then determines the x-y coordinates of the FOIs based on the location of the ranked OOIs (action block 338) in a manner similar to that described above with respect to action block 140. The routing processor 34 then maps the x-y coordinates of the FOIs using a suitable routing algorithm (action block 340), and stores the x-y coordinates of the FOIs, along with the routing plan in the non-volatile memory 36 for subsequent access by the reviewing stations 22 (action block 342) in a manner similar to that described above with respect to action blocks 142 and 144.

In the object reconstruction steps performed in the methods of FIGS. 8, 10, and 12, the corresponding image data frames can be digitally stitched together. Reconstruction of a combined frame that includes components from actual acquired frames may require a process of image registration and in some cases interpolation. Each image data frame possesses a unique x-y positional identifier in the imaging coordinate system. Assuming negligible stage position error (less than the size of a pixel), the alignment process is effectively handled by simple coordinate calculations based on the unique x-y positional identifiers in order to extract the appropriate sub-windows from each image data frame required for reconstruction of the object (the "participating image data frames").

In the presence of non-negligible stage position error (greater than the size of a pixel), the results from the coordinate calculations serve as the starting point for the required alignment step. The alignment step consists of finding the position of the truncated object in all of the participating image data frames. One possible option for this step is to use a template matching technique, such as Normalized Correlation. In this embodiment, the truncated object from the source image data frame is used as the template and the other participating image data frames are cross-correlated over a small window centered on the position computed by the coordinate calculations. The size of the search window is defined by the maximum expected error of the stage and would typically only be a few pixels in each planar dimension. Once the position of best match is found it would be used to refine the original frame alignment, compensating for any stage position errors that might have occurred.

Figure 13:
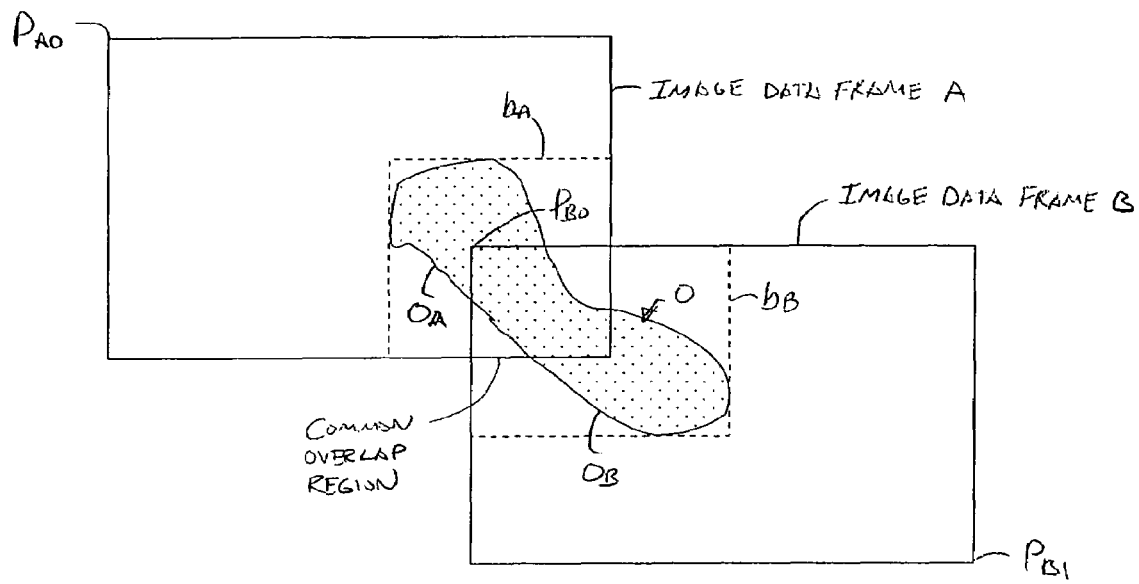
FIG. 13 is a schematic illustrating two adjacent image data frames within an imaging coordinate system.
Figure 14:
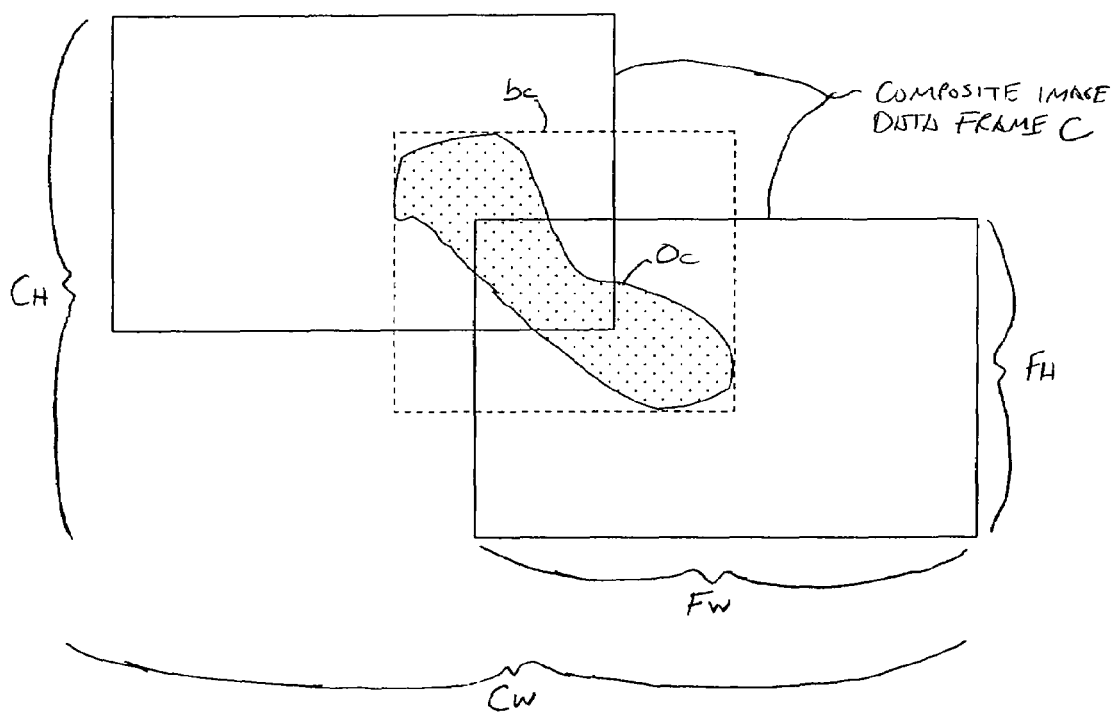
FIG. 14 is a schematic illustrating a composite image data frame generated from the image data frames of FIG. 13.

Referring to FIGS. 13 and 14, an exemplary method of digitally stitching two image data frames A, B together to reconstruct an object O from object portions $O_A$, $O_B$ respectively contained with the image data frames A, B will now be described. In order to reconstruct the object O, the individual image data frames A, B (shown in FIG. 13) are combined into a composite image data frame C (shown in FIG. 14). The size ($C_W \times C_H$) of the composite image data frame C can be calculated by first determining the minimum and maximum x-y extents of the image data frames within the imaging coordinate system. In this case, the left upper corner of image data frame A represents the minimum x-extent and minimum y-extent, and the right lower corner of image data frame B represents the maximum x-extent and maximum y-extent.

For this example, it is assumed that the nominal x-y position $P_{A0}$ of image data frame A (measured at the left upper corner) within the imaging coordinate system has been designated as 15676 μm, 10436 μm, the x-y position $P_{B0}$ of image data frame B (measured at the left upper corner) within the imaging coordinate system has been designated as 16158 μm, 10717 μm. Thus, the x-y position of the left upper corner of the image data frame A within the imaging coordinate system is the nominal position $P_A$ given as 15676 μm, 10436 μm. The position $P_{B1}$ of the right lower corner of image data frame B within the imaging coordinate system can be calculated by transforming the pixel width and height of image data frame B into an x- and y- distance and adding it to the nominal position of image data frame B (as measured at the left upper corner of image data frame B) given as 16158 μm, 10717 μm.

Thus, assuming that each image data frame has a pixel width $F_W$ of 763 pixels and a pixel height $F_H$ of 574 pixels, and that a distance-to-pixel ratio k is 0.7 μm/pixel, the position of the right lower corner of image data frame B can be calculated as:

$$P_{B1} = P_{B0} + k \begin{bmatrix} F_W \\ F_H \end{bmatrix}$$
$$= \begin{bmatrix} 16138 \\ 10717 \end{bmatrix} + 0.7 \begin{bmatrix} 763 \\ 574 \end{bmatrix}$$
$$= \begin{bmatrix} 16719 \\ 11251 \end{bmatrix}$$

Thus, the width $C_W$ of the composite image data frame C can be calculated as:

$$C_W = \frac{(PB1x - PA0x)}{k}$$

$$= \frac{(16719 - 15676)}{0.7}$$
$$= 1470; \text{ and}$$

the height $C_H$ of the composite image data frame C can be calculated as:

$$C_H = \frac{(PB1y - PA0y)}{k}$$
$$= \frac{(11251 - 10436)}{0.7}$$
$$= 976$$

In order to combine image data frames A, B into the composite image data frame C illustrated in FIG. 14, an offset $O_{FF}$ between the image data frames A, B within a pixel coordinate system (with the origin of such system corresponding to the left upper corner of image data frame A) must be calculated. This offset can simply be calculated based on difference between the nominal positions of the image data frames A, B as:

$$O_{FF} = \frac{(P_{B0} - P_{A0})}{k}$$
$$= \frac{\begin{bmatrix} 16158 \\ 10717 \end{bmatrix} - \begin{bmatrix} 15676 \\ 10436 \end{bmatrix}}{0.7}$$
$$= \begin{bmatrix} 742 \\ 402 \end{bmatrix}$$

This offset $O_{FF}$ can then be applied to the pixels of the image data frame B before copying the pixels to those of the image data frame A, which are already registered within the pixel coordinate system of the composite image data frame C. That is, the pixels of the image data frame B will be offset by 742 along the widthwise direction ($O_{FFW}$) and 402 along the heightwise direction ($O_{FFH}$) prior to their copying.

Depending on the quality of the motorized stage 28 and the pixel size, the digital stitching of the two image data frames A, B may possess misalignment that will adversely affect any subsequent calculations using the composite image data frame C. As such, any resulting errors in the offset $O_{FF}$ may be compensated for to refine the digital stitching process. A solution to this problem is to register the image data frames A, B using the common overlap region as an alignment template, as illustrated in FIG. 13. The region of image data frame A corresponding to the alignment template (which contains the same portion of the object O contained in image data frame B) is then cross-correlated against the image data frame B to determine an offset deviation within the imaging coordinate system. This cross-correlation can be performed in constrained regions in image data frame B, greatly reducing computational requirements. This determined offset deviation, after being scaled into the pixel coordinate system (i.e., after being divided by the distance-to-pixel ratio k), is then applied to the nominal offset OFF. The scaled offset deviation is expected to be relatively small (1-2 pixels), and in some cases may be negligible. In practice, any deviation less than ½ pixel may be ignored.

After alignment of the image data frames A, B, the generation of the composite image data frame C naturally results in the reconstruction of the object $O_C$ shared by the individual data frames A, B. As illustrated in FIG. 14, a composite boundary box $b_C$ that bounds the reconstructed object $O_C$ can be created from the individual boundary boxes $b_A$, $b_B$ (shown in FIG. 13) that bound the respective object portions $O_A$ and $O_B$ in the image data frames A, B.

It should be appreciated that, instead of digitally stitching the entirety of the image data frames A, B into a composite image data frame C, only the regions of the image data frames A, B necessary to reconstruct the object O may be digitally stitched together. However, because there is often more than one object that needs to be reconstructed along any given border of an image data frame, it may be more efficient to digitally stitch together entire image data frames A, B, so that the composite image data frame is available for multiple object reconstructions. To this end, it may also be more efficient to digitally stitch together many image data frames (e.g., three rows of image data frames) into a composite image data frame, and then recall this composite image data frame each time an object requires reconstruction. Image data frames can then be added to or subtracted from (e.g., when not needed for future reconstruction of objects) the composite image data frame as needed.

Although particular embodiments of the present invention have been shown and described, it should be understood that the above discussion is not intended to limit the invention to these embodiments. Those skilled in the art will appreciate that various changes and modifications may be made to the above-described embodiments without departing from the invention, as defined by the appended claims.

What is claimed:

1. An automated method for analyzing a biological specimen on a microscope slide, comprising:
    receiving magnified image data frames of the biological specimen taken at different locations on the slide;
    using a processor to identify an object that is not entirely contained within at least one of the image data frames;
    matching complementary portions of the identified object respectively located in different ones of the image data frames;
    creating a fully integrated object from the matched object portions;
    analyzing attributes of the integrated object; and
    determining a size of one of the complementary object portions, wherein the integrated object is created only if the size of the one object portion is greater than a threshold size.

2. A computer readable medium for analyzing a biological specimen on a microscope slide, containing instructions, which when executed by a computer processor, comprise:
    receiving magnified image data frames of the biological specimen taken at different locations on the slide;
    identifying an object that is not entirely contained within at least one of a plurality of magnified image data frames taken of the biological specimen;
    matching complementary portions of the identified object respectively located in different ones of the image data frames;
    creating a fully integrated object from the matched object portions; and
    analyzing attributes of the integrated object,
    wherein the instructions, when executed, further comprise determining a size of one of the complementary object portions, wherein the integrated object is created only if the size of the one object portion is greater than a threshold size.

* * * * *

UNITED STATES PATENT AND TRADEMARK OFFICE
CERTIFICATE OF CORRECTION

PATENT NO.      : 7,636,465 B2                                        Page 1 of 1
APPLICATION NO. : 11/299046
DATED           : December 22, 2009
INVENTOR(S)     : Paul Dutta-Choudhury It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1033 days.

Signed and Sealed this

Ninth Day of November, 2010

David J. Kappos
*Director of the United States Patent and Trademark Office*